US012700219B2

(12) United States Patent
Wen

(10) Patent No.: US 12,700,219 B2
(45) Date of Patent: Aug. 4, 2026

(54) TRAINING OF MACHINE LEARNING MODELS FOR VIDEO ANALYTICS

(71) Applicant: The ADT Security Corporation, Boca Raton, FL (US)

(72) Inventor: Tarmily Wen, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 472 days.

(21) Appl. No.: 18/182,178

(22) Filed: Mar. 10, 2023

(65) Prior Publication Data

US 2024/0303972 A1 Sep. 12, 2024

(51) Int. Cl.
| | |
|---|---|
| *G06V 10/774* | (2022.01) |
| *G06V 10/70* | (2022.01) |
| *G06V 10/776* | (2022.01) |
| *G06V 20/40* | (2022.01) |

(52) U.S. Cl.
CPC .......... *G06V 10/774* (2022.01); *G06V 10/776* (2022.01); *G06V 10/87* (2022.01); *G06V 20/49* (2022.01)

(58) Field of Classification Search
CPC .... G06V 10/774; G06V 10/776; G06V 10/87; G06V 20/49
See application file for complete search history.

(56) References Cited

U.S. PATENT DOCUMENTS

| | | | |
|---|---|---|---|
| 10,860,859 B2 | 12/2020 | Yang et al. | |
| 2010/0195870 A1* | 8/2010 | Ai | G06T 7/277 |
| | | | 382/103 |
| 2018/0082152 A1* | 3/2018 | Katz | G06F 16/783 |
| 2020/0133500 A1 | 4/2020 | Shang et al. | |
| 2020/0293783 A1* | 9/2020 | Ramaswamy | G06N 3/09 |
| 2021/0201047 A1* | 7/2021 | Hwangbo | G06N 3/08 |
| 2021/0245043 A1 | 8/2021 | Shriram et al. | |
| 2022/0207875 A1* | 6/2022 | Kopparapu | G06N 20/00 |
| 2022/0406038 A1 | 12/2022 | AlDarabsah et al. | |
| 2023/0162359 A1* | 5/2023 | Choi | G16H 50/20 |
| | | | 382/128 |
| 2025/0217446 A1* | 7/2025 | Xu | G06F 18/22 |

FOREIGN PATENT DOCUMENTS

| | | |
|---|---|---|
| EP | 2164041 B1 | 4/2015 |
| WO | 2022099313 A1 | 5/2022 |
| WO | 2022146707 A1 | 7/2022 |

* cited by examiner

*Primary Examiner* — Amandeep Saini
*Assistant Examiner* — Caroline Tabancay Duffy
(74) *Attorney, Agent, or Firm* — Weisberg I.P. Law, P.A.

(57) ABSTRACT

A management node is described. A method implemented in a management node is described. The method comprises receiving a video segment and selecting a plurality of subsegments of the video segment based on a selection criteria. The selection criteria comprise rules based on at least one of a selection characteristic, a subsegment characteristic, a video segment characteristic, or a system characteristic. The method further includes training a machine learning (ML) model using the plurality of subsegments selected based on the selection criteria.

16 Claims, 8 Drawing Sheets

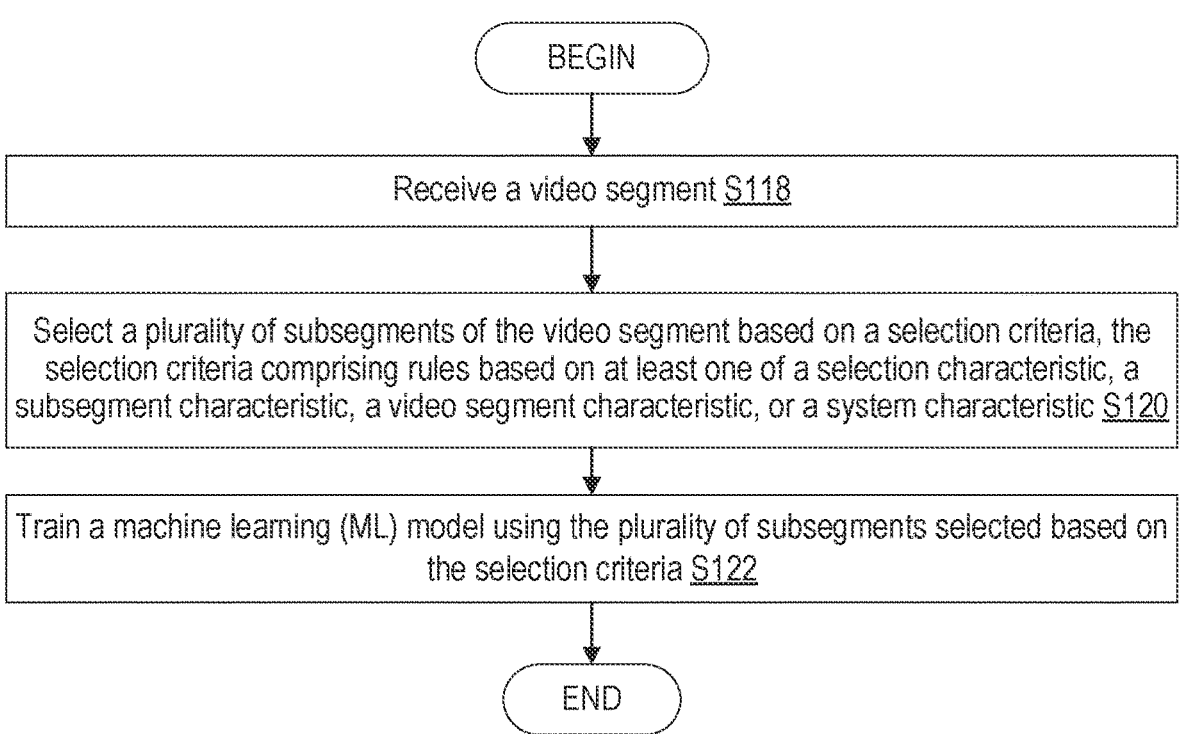

BEGIN

Receive a video segment S118

Select a plurality of subsegments of the video segment based on a selection criteria, the selection criteria comprising rules based on at least one of a selection characteristic, a subsegment characteristic, a video segment characteristic, or a system characteristic S120

Train a machine learning (ML) model using the plurality of subsegments selected based on the selection criteria S122

END

FIG. 6

TRAINING OF MACHINE LEARNING MODELS FOR VIDEO ANALYTICS

TECHNICAL FIELD

The present technology is generally related to learning processes associated with artificial intelligence.

BACKGROUND

Artificial intelligence (AI) systems may be configured to perform tasks associated with human intelligence, such as reasoning and learning. In general, AI systems receive training data, analyze the data to determine correlations and patterns, and use the correlations and patterns to make predictions. For example, an image recognition system using AI can learn to identify and describe objects in images. AI systems may also receive video data and predict whether an object will be present in other video data.

Machine learning (ML) is considered a part of AI. In general, ML systems may be configured to produce models that can perform tasks based on training data. For example, an ML system may be used in the field of computer vision, where the ML system receives training data to identify objects, persons, animals, and other variables in images. The identification may be performed by recognizing patterns and correlations in the training data, and classifying the patterns and correlations.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 6 is a flowchart of another example process in a management node according to some embodiments of the present disclosure;

DETAILED DESCRIPTION

Figure 1:
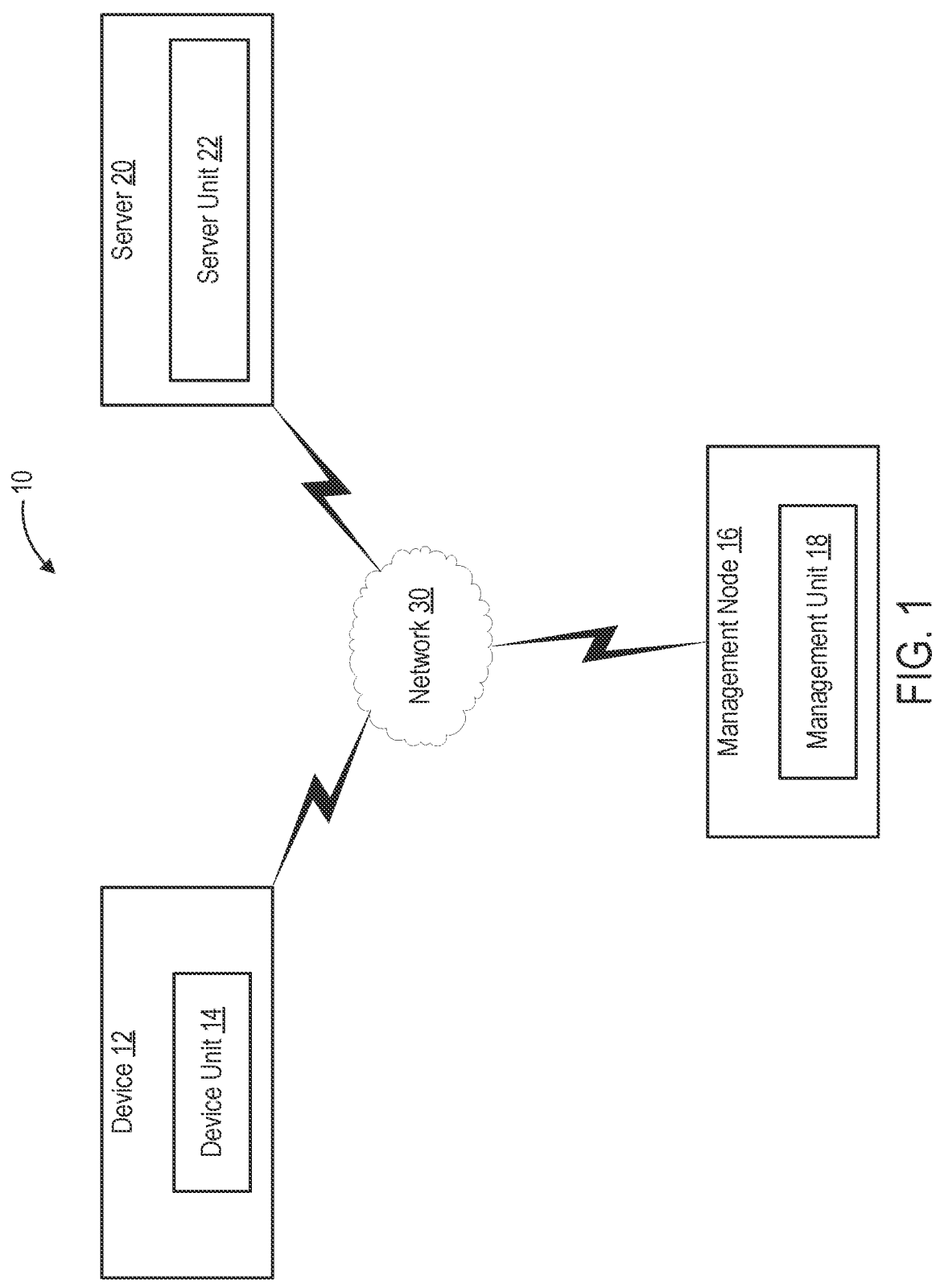
FIG. 1 is a schematic diagram of various devices and components according to some embodiments of the present disclosure.

Before describing in detail exemplary embodiments, it is noted that some embodiments may reside in combinations of apparatus components and processing steps related to training learning models (e.g., machine learning models) for video analytics. Accordingly, components may be represented by conventional symbols in the drawings, focusing on details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein.

Referring now to the drawing figures, in which like elements are referred to by like reference numerals, there is shown in FIG. 1 is a schematic diagram of a system 10. System 10 may include a device 12 (e.g., comprising device unit 14), management node 16 (e.g., comprising management unit 18), and server 20 (e.g., comprising server unit 22). Device 12 may be configured to capture, sense, or store video or video data such as via device unit 14. Management node 16 may be configured to select subsets of video data, such as frames. Management node may be configured to train and test models, such as ML models, using the selected subsets of video data. Further, management node 16 may be configured to perform one or more actions such as deploy a model in management node 16, another management node 16, or any other device.

Server 20 may be configured to store and provide data associated with any of the processes performed by device 12 and management node 16, trigger device 12 and/or management node 16 to perform one or more actions, etc. In some embodiments, server 20 may comprise and be configured to perform one or more actions associated with a premises security system, a premises device, a premises controller, a premises security server, a digital video recorder server, an application server, etc. In some embodiments, server 20 may comprise and be configured to perform one or more actions associated with a self-driving system, a self-driving controller, self-driving device, etc.

In one or more embodiments, device 12, management node 16, server 20 may be configured to communicate with each other via one or more communication links and protocols, e.g., to train and test ML models. Further, system 10 may include network 30, which may be configured to provide direct and/or indirect communication, e.g., wired and/or wireless communication, between any two or more components of system 10, e.g., device 12, management node 16 and server 20. Although network 30 is shown as an intermediate network between components or devices of system 10, any component or device may communicate directly with any other component or device of system 10.

Further, device 12 may include one or more devices 24a-24n (collectively, devices 12). Similarly, management node 16 may include one or more management node 16a-16n (collectively, management node 16), and server 20 may include one or more server 20a-20n (collectively, servers 20).

Device 24 may be configured to sense and process images (e.g., to generate video data), and store the corresponding video data (e.g., where device 24 is a camera). In some embodiments, device 24 may comprise devices 24a, 24b, 24c, 26d, each one configured to record one or more videos (e.g., video clips, video data). In some other embodiments, device 24 may be comprised in any other component of system 10 such as management node 16 and/or server 20.

Figure 2:
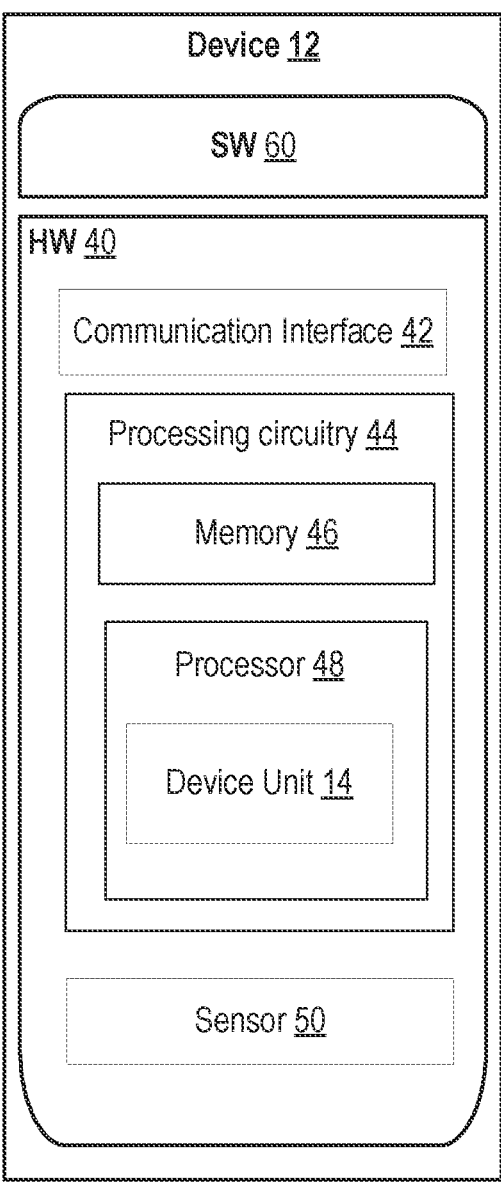
FIG. 2 is a block diagram of an example device according to some embodiments of the present disclosure.

FIG. 2 shows an example device 12, which may comprise hardware 40, including communication interface 42 and processing circuitry 44. The processing circuitry 44 may include a memory 46 and a processor 48. In addition to, or instead of a processor, such as a central processing unit, and memory, the processing circuitry 44 may comprise integrated circuitry for processing and/or control, e.g., one or more processors, processor cores, field programmable gate arrays (FPGAs) and/or application specific integrated circuits (ASICs) adapted to execute instructions. The processor 48 may be configured to access (e.g., write to and/or read from) the memory 46, which may comprise any kind of volatile and/or nonvolatile memory, e.g., cache, buffer memory, random access memory (RAM), read-only memory (ROM), optical memory and/or erasable programmable read-only memory (EPROM).

Communication interface 42 may comprise and/or be configured to support communication between device 12 and any other component of system 10. Communication interface 42 may include at least a radio interface configured to set up and maintain a wireless connection with network 30 and/or any component of system 10. The radio interface may be formed as, or may include, for example, one or more radio frequency, radio frequency (RF) transmitters, one or more RF receivers, and/or one or more RF transceivers. Communication interface 42 may include a wired communication interface, such as an Ethernet interface, configured to set up and maintain a wired connection with network 30 and/or any component of system 10. Further, hardware 40 may further comprise sensor 50 configured to sense, process, and store images, video, and video data (e.g., in memory 46).

Device 12 may further include software 60 stored internally in, for example, memory 46 or stored in external memory (e.g., database, storage array, network storage device, etc.) accessible by device 12 via an external connection. The software 60 may be executable by the processing circuitry 44. The processing circuitry 44 may be configured to control any of the methods and/or processes described herein and/or to cause such methods, and/or processes to be performed, e.g., by device 12. Processor 48 corresponds to one or more processors 48 for performing device 12 functions described herein. The memory 46 is configured to store data, programmatic software code and/or other information described herein. In some embodiments, the software 60 may include instructions that, when executed by the processor 48 and/or processing circuitry 44, causes the processor 48 and/or processing circuitry 44 to perform the processes described herein with respect to device 12. For example, processing circuitry 44 may include device unit 14 configured to perform one or more device 12 functions as described herein such as determining video data (e.g., sensing and processing images, generating video data) and causing transmission of the video data.

Figure 3:
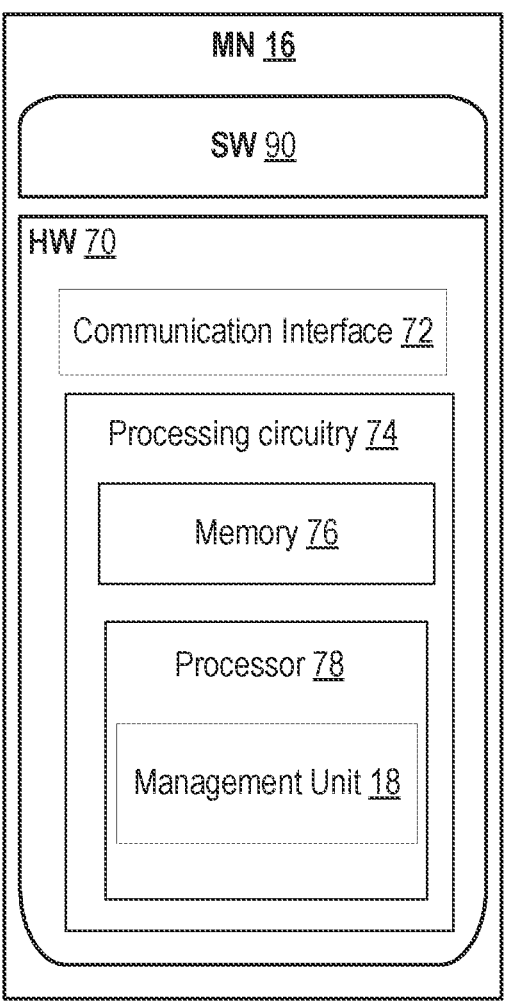
FIG. 3 is a block diagram of an example management node according to some embodiments of the present disclosure.

FIG. 3 shows an example management node 16, which may comprise hardware 70, including communication interface 72 and processing circuitry 74. The processing circuitry 74 may include a memory 76 and a processor 78. In addition to, or instead of a processor, such as a central processing unit, and memory, the processing circuitry 44 may comprise integrated circuitry for processing and/or control, e.g., one or more processors, processor cores, FPGAs and/or ASICs adapted to execute instructions. The processor 78 may be configured to access (e.g., write to and/or read from) the memory 76, which may comprise any kind of volatile and/or nonvolatile memory, e.g., cache, buffer memory, RAM, ROM, optical memory and/or EPROM.

Communication interface 72 may comprise and/or be configured to support communication between management node 16 and any other component of system 10. Communication interface 72 may include at least a radio interface configured to set up and maintain a wireless connection with network 30 and/or any component of system 10. The radio interface may be formed as, or may include, for example, one or more radio frequency, RF transmitters, one or more RF receivers, and/or one or more RF transceivers. Communication interface 72 may include a wired communication interface, such as an Ethernet interface, configured to set up and maintain a wired connection with network 30 and/or any component of system 10.

Management node 16 may further include software 90 stored internally in, for example, memory 76 or stored in external memory (e.g., database, storage array, network storage device, etc.) accessible by management node 16 via an external connection. The software 90 may be executable by the processing circuitry 74. The processing circuitry 74 may be configured to control any of the methods and/or processes described herein and/or to cause such methods, and/or processes to be performed, e.g., by management node 16. Processor 78 corresponds to one or more processors 78 for performing management node 16 functions described herein. The memory 76 is configured to store data, programmatic software code and/or other information described herein. In some embodiments, the software 90 may include instructions that, when executed by the processor 78 and/or processing circuitry 74, causes the processor 48 and/or processing circuitry 74 to perform the processes described herein with respect to management node 16. For example, processing circuitry 74 may include management unit 18 configured to perform one or more management node 16 functions as described herein such as selecting one or more subsets of video data such as frame from a plurality of video clips, training and testing models such as ML models based on the selected subsets of video data, deploying selected ML models to other management node 16, receiving ML models selected by other management node 16 and perform one or more actions based on the received ML models, etc.

Figure 4:
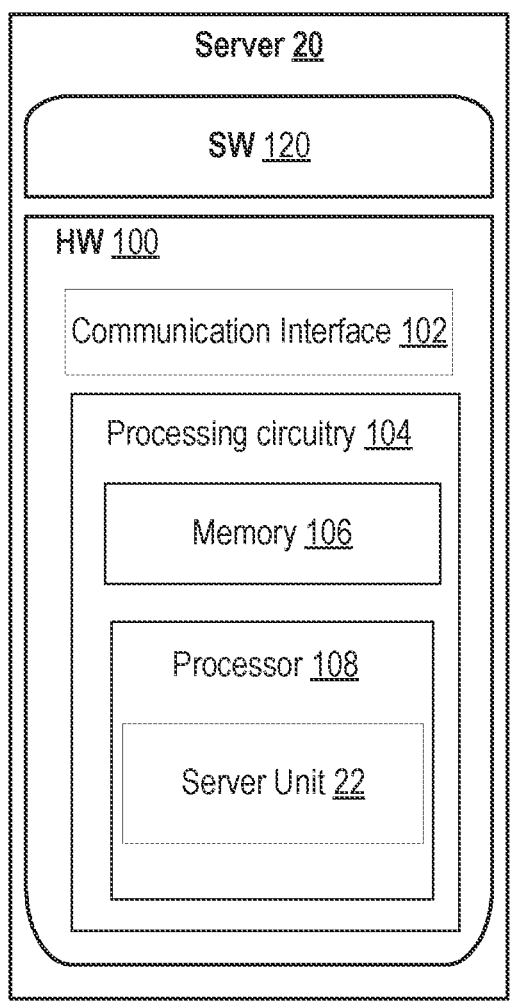
FIG. 4 is a block diagram of an example server according to some embodiments of the present disclosure.

FIG. 4 shows an example server 20, which may comprise hardware 100, including communication interface 102 and processing circuitry 104. The processing circuitry 104 may include a memory 106 and a processor 108. In addition to, or instead of a processor, such as a central processing unit, and memory, the processing circuitry 104 may comprise integrated circuitry for processing and/or control, e.g., one or more processors and/or processor cores and/or FPGAs and/or ASICs adapted to execute instructions. The processor 108 may be configured to access (e.g., write to and/or read from) the memory 106, which may comprise any kind of volatile and/or nonvolatile memory, e.g., cache and/or buffer memory and/or RAM and/or ROM and/or optical memory and/or EPROM.

Communication interface 102 may comprise and/or be configured to support communication between server 20 and any other component of system 10. Communication interface 102 may include at least a radio interface configured to set up and maintain a wireless connection with network 30 and/or any component of system 10. The radio interface may be formed as, or may include, for example, one or more RF transmitters, one or more RF receivers, and/or one or more RF transceivers. Communication interface 102 may include a wired communication interface, such as an Ethernet interface, configured to set up and maintain a wired connection with network 30 and/or any component of system 10.

Server 20 may further include software 120 stored internally in, for example, memory 106 or stored in external memory (e.g., database, storage array, network storage device, etc.) accessible by server 20 via an external connection. The software 120 may be executable by the processing circuitry 104. The processing circuitry 104 may be configured to control any of the methods and/or processes described herein and/or to cause such methods, and/or processes to be performed, e.g., by server 20. Processor 108 corresponds to one or more processors 108 for performing server 20 functions described herein. The memory 106 is configured to store data, programmatic software code and/or other information described herein. In some embodiments, the software 120 may include instructions that, when executed by the processor 108 and/or processing circuitry 104, causes the processor 48 and/or processing circuitry 104 to perform the processes described herein with respect to server 20. For example, processing circuitry 104 may include server unit 22 configured to perform one or more server functions as described herein such as receive and provide information associated with training and testing models, trigger an management node 16 to perform one or more actions such as train and test models, deploy models, perform other actions based on selected models, etc.

Figure 5:
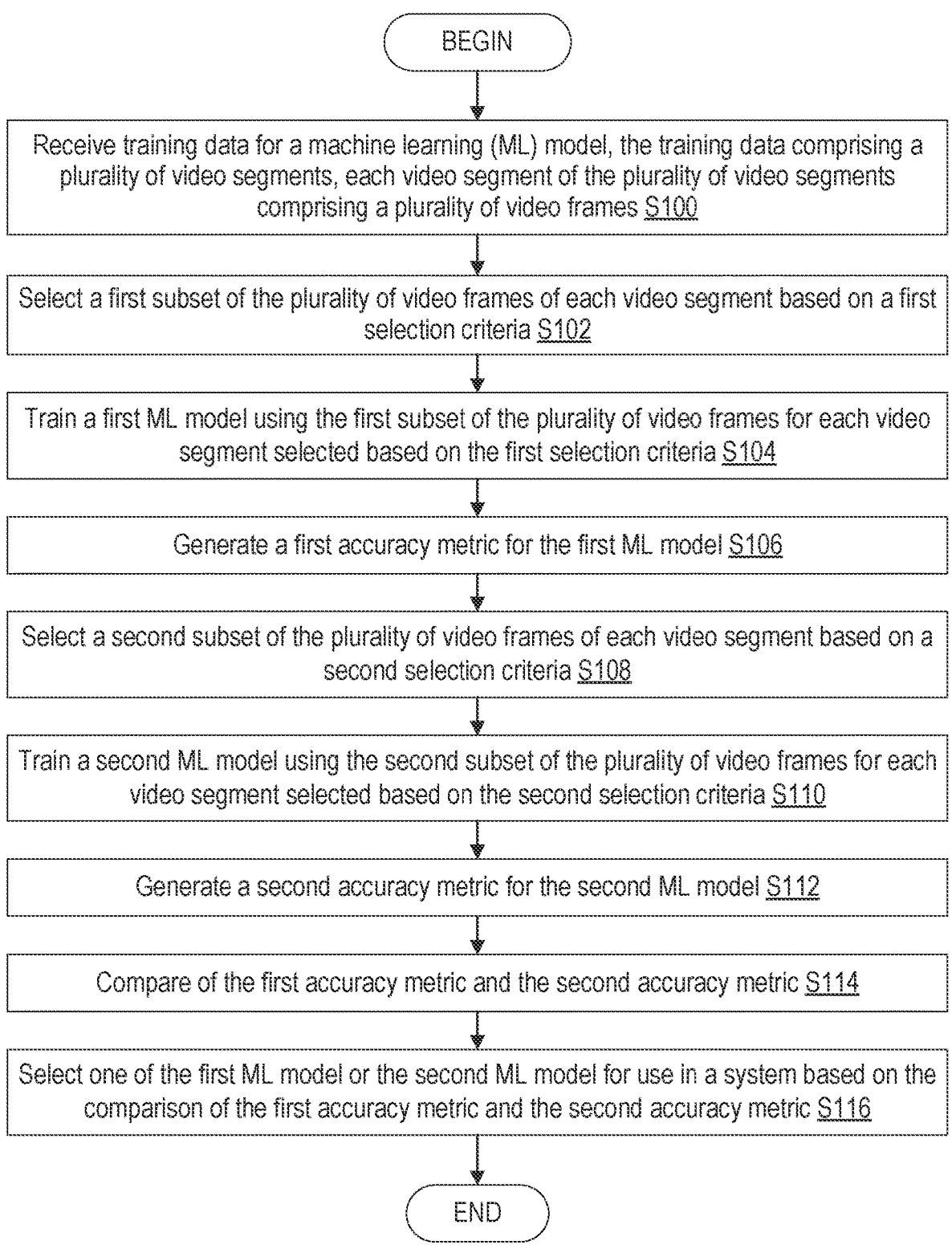
FIG. 5 is a flowchart of an example process in a management node according to some embodiments of the present disclosure.

FIG. 5 is a flowchart of an example process (i.e., method) implemented by management node 16 according to some embodiments of the invention. One or more blocks described herein may be performed by one or more elements of management node 16 such as by one or more of processing circuitry 74, management unit 18, and/or communication interface 72. Management node 16 is configured to receive (Block S100) training data for a machine learning (ML) model, where the training data comprise a plurality of video segments, and each video segment of the plurality of video segments comprises a plurality of video frames. The management node 16 is further configured to select (Block S102) a first subset of the plurality of video frames of each video segment based on a first selection criteria, train (Block S104) a first ML model using the first subset of the plurality of video frames for each video segment selected based on the first selection criteria, and generate (Block S106) a first accuracy metric for the first ML model. In addition, the management node 16 is configured to select (Block S108) a second subset of the plurality of video frames of each video segment based on a second selection criteria, train (Block S110) a second ML model using the second subset of the plurality of video frames for each video segment selected based on the second selection criteria, generate (Block S112) a second accuracy metric for the second ML model, compare of the first accuracy metric and the second accuracy metric, and select (Block S116) one of the first ML model or the second ML model for use in a system based on the comparison of the first accuracy metric and the second accuracy metric.

FIG. 6 is a flowchart of another example process (i.e., method) implemented by management node 16 according to some embodiments of the invention. One or more blocks described herein may be performed by one or more elements of management node 16 such as by one or more of processing circuitry 74, management unit 18, and/or communication interface 72. Management node 16 is configured to receive (Block S118) a video segment, select (Block S120) a plurality of subsegments of the video segment based on a selection criteria, where the selection criteria comprise rules based on at least one of a selection characteristic, a subsegment characteristic, a video segment characteristic, or a system characteristic, and train (Block S122) a machine learning (ML) model using the plurality of subsegments selected based on the selection criteria.

In some embodiments, video segment may comprise, for example, data and/or information corresponding to audio content and/or visual content. A video segment may also comprise video, video clips, video files, subsets of video data such as frames. A video segment may further correspond to one or more objects, object motion and may be associated with one or more parameters such as motion parameters, video clip parameters (e.g., video clip length), video files parameters (e.g., video format). In addition, a video segment may correspond to video captured in digital or analog format such as by a video camera.

In some other embodiments, video subsegment may comprise, for example, a portion of a video segment such as a frame, a group of frames, object, image, etc. A video segment may also comprise a plurality of subsegments such as a beginning subsegment, and intermediate subsegment, and an end subsegment. For example, a beginning subsegment may be the first frame (e.g., in time), the end subsegment may be the last frame (e.g., in time) of a video clip, and the intermediate subsegment may be any frame in between the first and last frames.

In some embodiments, the selection characteristic comprises manual selection or random selection of the plurality of subsegments.

In some other embodiments, the subsegment characteristic comprises (A) equal spacing in time with respect to one or more subsegments; (B) association with an object present in one or more of previously selected subsegments and in an additional subsegment, where the object in the additional subsegment has at least one modified characteristic; (C) intermediate subsegments resulting from removal of equally spaced subsegments in time; or (D) a weight of a pre-weighed subsegment.

In some embodiments, the video segment characteristic comprises a length of the video segment.

In some other embodiments, the system characteristic comprises a computing parameter of the management node.

In some embodiments, the method further comprises selecting a plurality of additional subsegments of the video segment based on an additional selection criteria and training an additional ML model using the plurality of additional subsegments selected based on the additional selection criteria.

In some other embodiments, the method further comprises testing the ML model and the additional ML model based on an accuracy threshold.

In some embodiments, the method further comprises selecting one of the ML model or the additional ML model based on a result of testing the ML model and the additional ML model based on the accuracy threshold.

In some other embodiments, the method further comprises generating an accuracy metric for the ML model, generating an additional accuracy metric for the additional ML model, and selecting one of the ML model or the additional ML model for deployment based on the accuracy metric and the additional accuracy metric.

Having described the general process flow of arrangements of the disclosure and having provided examples of hardware and software arrangements for implementing the processes and functions of the disclosure, the sections below provide details and examples of arrangements for training of models (e.g., ML models) for video analytics.

In some embodiments, training a model (e.g., a ML model) to detect an object in video may involve providing the model with a plurality of video segments known to depict the object. For example, to train a model to detect vehicles in videos, the model is trained using videos that have been labeled as depicting vehicles. However, it can be costly to store a large quantity of video segments. In addition, training a model using a large quantity of video segments may consume a large amount of computing power and time.

One or more embodiments provide training ML models using subsegments from video segments that are selected based on selection criteria, e.g., on a randomized basis. Selecting some video subsegments for training ML models may result in a reduction of storage and processing costs (when compared to conventional technology).

In some embodiments, one or more video segments are obtained (e.g., by management node 16 from device 12 and/or server 20). One or more of the video segments may depict examples of an object of interest. For example, if the ML model is intended to detect humans in a video, a library of video segments depicting examples of humans is obtained.

In some other embodiments, for each video segment, a number "N" of subsegments (e.g., frames, a set of frames, etc.) of a video segment are selected based on selection criteria. The selection criteria may comprise, without being limited to, one or more subsegments (e.g., frames) of a video segment that: (A) are manually selected by a user; (B) are part of a set of subsegments randomly selected (e.g., within a predetermined range of subsegments); (C) are equally spaced in time; (D) comprise or correspond to or are associated with an object present in one or more of previously selected subsegments and in an additional subsegment where the object in the additional subsegment has at least one modified characteristic; (D) are determined to be intermediate subsegments (i.e., not in the beginning or end of the video segment) and not previously selected as equally spaced in time; (E) are pre-weighed subsegments (e.g., based on pre-evaluation of an entirety or set of subsegments), where the weight of each selected subsegment meets a weight condition (e.g., exceeds, does not exceed, or equals a predetermined weight); (F) are selectable based on the length of the video segment; and (G) are selectable based on a computing parameter of a component of system 10 (e.g., such as storage space, processing speed of management node 16, time to complete a model training task, etc.). Selection criteria (A) and (B) may correspond to a selection mode. Selection criteria (C)-(F) may correspond to criteria based on a subsegment characteristic or video segment characteristic. Selection criterion (G) may correspond to criteria based on a system characteristic.

In some embodiments, a modified characteristic, as described in selection criteria (D), may comprise an object characteristic that is modified, changed, or varied when the same object that is in different frames is compared. The object characteristic may comprise object color, geometry, dimensions, form, shape, etc. In a nonlimiting example, a person in one video frame may be shown as wearing a white dress, while the same person in another video frame may be shown as wearing a red dress. The frame where the same person is shown as wearing the white dress and the frame the where the same person is shown as wearing the red dress may be selected to train one or more ML models.

In some other embodiments, the number N is the same for all video segments. In other embodiments, the number N varies for one or more video segments.

In some embodiments, the number N corresponds to the length of the video segment. For example, ten (e.g., frames) may be selected for a ten-second video segment, while twenty subsegments may be selected for a twenty-second video segment.

In some other embodiments, once the subsegments are selected for one or more video segments, the subsegments may be fed to the one or more ML models for training. In some embodiments, various parameters, such as the number of subsegments selected for the various video segments may be adjusted, and the resulting selected subsegments used to train additional ML models. The accuracy of the resulting trained ML models may be compared (e.g., to the accuracy of other ML models) to identify one or more particular models that meet a model deployment criteria.

Figure 7:
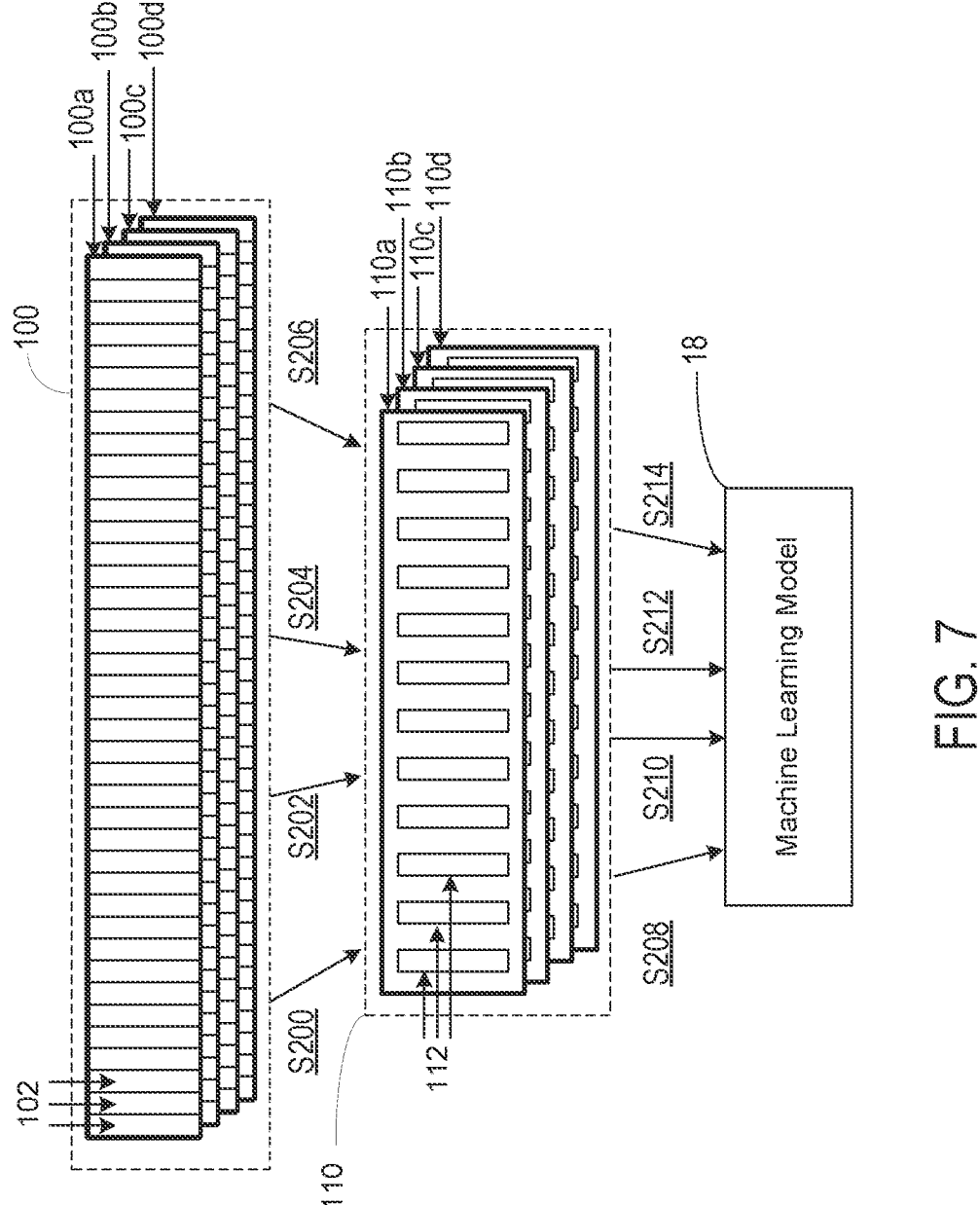
FIG. 7 is a diagram illustrating an example of functionality according to some embodiments of the present disclosure.

FIG. 7 shows an example process of selection of one or more subsegments of a video segment for training and testing one or more ML models according to one or more embodiments. In this nonlimiting example, a plurality of video segments 100 may be obtained by management node 16 (e.g., from device 12 and/or server 20). The plurality of video segments 100 may comprise a first video segment 100a, a second video segment 100b, a third video segment 100c, and a fourth video segment 100d. Each video segment 100 comprises one or more subsegments 102 (e.g., forty subsegments) of the video segment 100. For example, a subsegment 102 may comprise a frame, a group of frames, an object, an image, video data, or image data, or any portion of the video segment 100.

Further, management node 16 may be configured to select one or more subsegments 102 from one or more obtained video segments 100. For example, management node 16 may be configured to select, at step S200, one or more subsegments 102 from video segment 100a, select, at step S202, one or more subsegments 102 from video segment 100b, select, at step S204, one or more subsegments 102 from video segment 100c, select, at step S206, one or more subsegments 102 from video segment 100d. That is, at step S200, a first group 110a of subsegments 102 is selected, at step S202, a second group 110b of subsegments 102 is selected, at step S204, a third group 110c of subsegments 102 is selected, and at step S206, a fourth group 110d of subsegments 102 is selected. The subsegments of each group 110 that are selected may be referred to as selected subsegments 112, and groups 110a, 110b, 110c, and 110d may be referred to as a plurality of groups 110 of selected subsegments 112.

Although selected subsegments 112 of a group of selected subsegments 110 are shown as corresponding to (e.g., being selected from) the subsegments 102 of one video segment 100, the embodiments of the present disclosure are not limited as such, i.e., subsegments 102 from different video segments 100 may be selected and comprised in one or more groups 110 of selected subsegments 112. Further, the selection (i.e., performed in any one of steps S200, S202, S204, S206) may be performed based on selection criteria. In one or more embodiments, the selection may comprise comparing subsegments 102 and/or selected subsegments 112 to one or more other subsegments 102 and/or other selected subsegments 112.

In some embodiments, management node 16 (e.g., management unit 18) is configured to determine one or more ML models and use the selected subsegments 112 of one or more groups 110*a*, 110*b*, 110*c*, 110*d* (e.g., obtained by management node 16 at steps S208, S210, S12, S214) to train the one or more ML models.

Various parameters, such as the number of selected subsegments 112 for the various video segments may be adjusted, and the resulting selected subsegments used to train additional ML models. One or more of the ML models may be selected for deployment based on an accuracy of each ML model and an accuracy threshold.

In some embodiments, management node 16 selects one or more ML models so that one or more actions are performed by management node 16 and/or any other components of system 10. For example, management node 16 (or another management node 16 or any other component of system 10) may be configured to use a selected ML model for recognition and prediction of motion, images, objects, etc. In a more specific example, a first management node 16 selects one or more ML models that are later transmitted to a second management node 16 comprised in a security system. The second management node 16 may be configured to communicate with the security system (and its components) to trigger the security system to perform one or more security actions based on video and video segments provided by cameras of the security system and the selected ML models.

Figure 8:
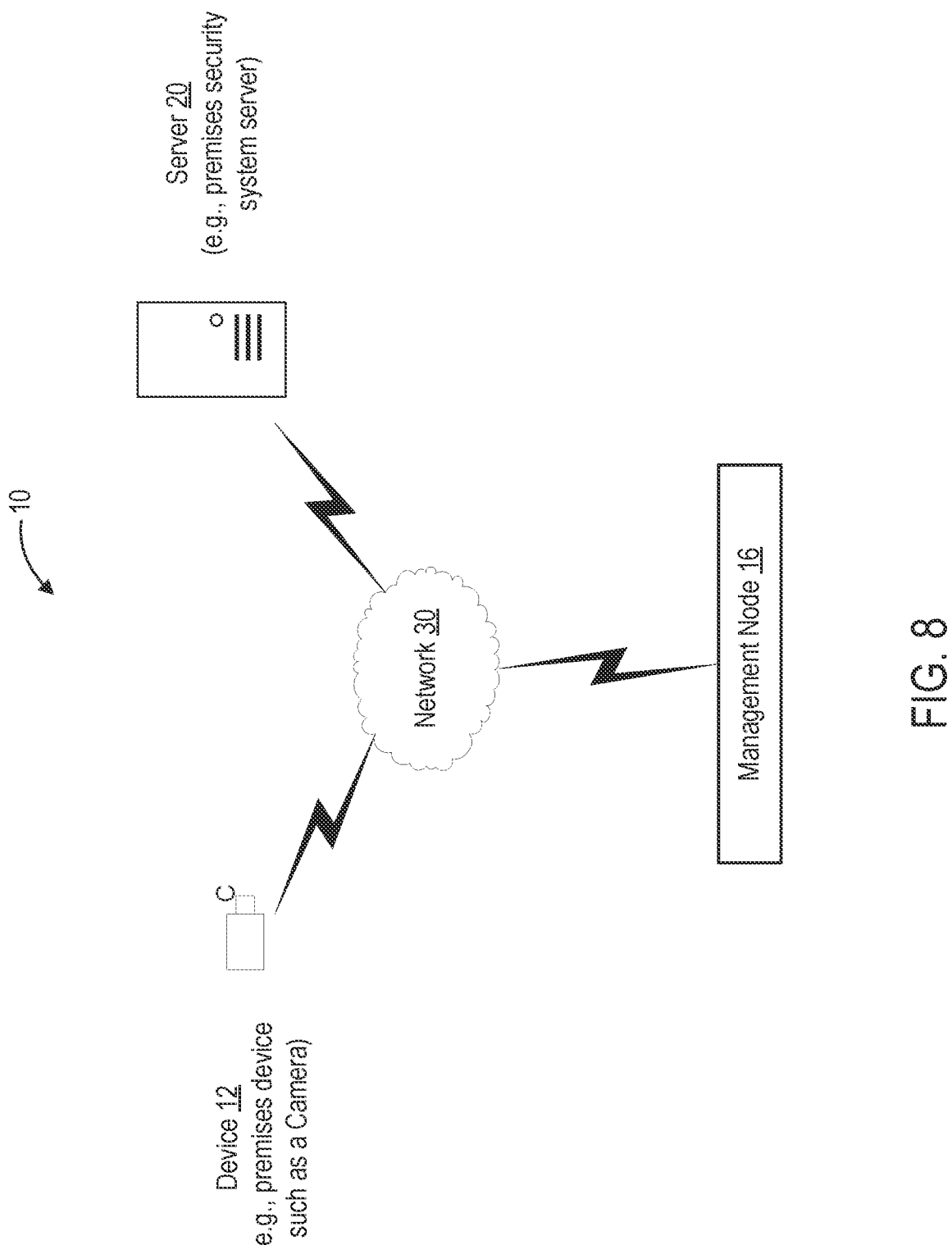
FIG. 8 is a schematic diagram of an example implementation of a management node according to some embodiments of the present disclosure.

FIG. 8 is a schematic diagram of an example implementation of management node 16 according to some embodiments of the present disclosure. System 10 (e.g., premises security system) may comprise a device 12, management node 16, and server 20. Device 12 may be a premises device, such as a camera configured to capture video segments (e.g., video of the premises) and transmit the video to one or both of management node 16 and server 20. Server 20 may be a premises security system server (or premises security controller) configured to manage one or more functions of system 10 such as video monitoring of the premises. In some embodiments, server 20 is a digital video recording system configured to manage video functions associated with video, detection of objects in video segments, prediction of objects in video segments, etc. management node 16 may be configured to perform selection of video subsegments of the video segments such as provided by device 12 and/or server 20. management node 16 may be further configured to train ML models based on selected video subsegments and/or deploy the trained ML models in any other component of system 10, such as management node 16, another management node 16, server 20, and device 12. The deployed ML models may be used for detecting and predicting objects and behavior such as persons, automobiles, predicted unauthorized access to a premises, detection of objects for the first time (e.g., visitor never detected before), prediction of traffic flow in premises parking garage, etc.

In some embodiments, management node 16 receives (e.g., via network 30) one or more video segments from the device 12 and selects one or more subsegments of the one or more video segments based on a selection criteria corresponding to one or more of a selection mode, a subsegment characteristic, a video segment characteristic, and a system characteristic.

Management node 16 may be further configured to train one or more ML models using the selected one or more subsegments of the one or more video segments, where the one or more ML models comprise a first ML model and a second ML model. One or both of the trained first and second ML models may be deployed in any system component. In a nonlimiting example, management node 16 may determine that the second ML model is more accurate at detecting and prediction objects in selected video subsegments (e.g., frames) than the first model. management node 16 may deploy the second model in one or both of management node 16 and server 20 for detection and prediction of objects in video subsegments. Selecting some video subsegments, instead of the entire video segment, for training ML models is beneficial at least because the training of ML is less computing intensive than using the entirety of a video segment (e.g., all frames in a video clip).

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The present disclosure is not limited to what has been particularly shown and described herein above. In addition, unless mention was made above to the contrary, all of the accompanying drawings are not to scale. A variety of modifications and variations are possible in light of the above teachings and following claims.

What is claimed is:

1. A method implemented in a management node, the method comprising:

receiving training data for a machine learning (ML) model, the training data comprising a plurality of video segments, each video segment of the plurality of video segments comprising a first subset of a plurality of video frames and a second subset of the plurality of video frames;

selecting the first subset of the plurality of video frames of each video segment for training a first machine learning (ML) model, the selection being based on a first selection criteria that comprises rules based on a subsegment characteristic, the subsegment characteristic comprising:

a weight of a pre-weighed subsegment; or association with an object present in one or more of previously selected subsegments and in an additional subsegment, the object in the additional subsegment having at least one modified characteristic;

training the first ML model using the first subset of the plurality of video frames for each video segment that were selected based on the first selection criteria, the second subset of the plurality of frames not being used for training the first ML model;

generating a first accuracy metric for the first ML model;

selecting the second subset of the plurality of video frames of each video segment for training a second ML model, the selection being based on a second selection criteria;

training the second ML model using the second subset of the plurality of video frames for each video segment that were selected based on the second selection criteria, the first subset of the plurality of video frames not being used for training the second ML model;

generating a second accuracy metric for the second ML model; and selecting one of the first ML model or the second ML model for use in a system based on a comparison of the first accuracy metric and the second accuracy metric.

2. A method implemented in a management node, the method comprising:

receiving a video segment comprising a first plurality of subsegments and a second plurality of subsegments;

selecting the first plurality of subsegments of the video segment for training a machine learning (ML) model, the selection being based on a selection criteria that comprises rules based on a subsegment characteristic, the subsegment characteristic comprising:

a weight of a pre-weighed subsegment; or association with an object present in one or more of previously selected subsegments and in an additional subsegment, the object in the additional subsegment having at least one modified characteristic;

training the ML model using the first plurality of subsegments that were selected based on the selection criteria, the second plurality of subsegments of the video segment not being used for training the ML model; and after training the ML model, testing the trained ML model based on an accuracy threshold.

3. The method of claim 2, wherein the rules are further based on a video segment characteristic comprising a length of the video segment.

4. The method of claim 2, wherein the rules are further based on a system characteristic comprising a computing parameter of the management node.

5. The method of claim 2, further comprising:

selecting a plurality of additional subsegments of the video segment based on an additional selection criteria, the plurality of additional subsegments being different from the first plurality of subsegments and the second plurality of subsegments; and training an additional ML model using the plurality of additional subsegments selected based on the additional selection criteria.

6. The method of claim 5, further comprising testing the additional ML model based on the accuracy threshold.

7. The method of claim 6, further comprising selecting one of the ML model or the additional ML model based on a result of testing the ML model and the additional ML model based on the accuracy threshold.

8. The method of claim 5, further comprising:

generating an accuracy metric for the ML model;

generating an additional accuracy metric for the additional ML model; and selecting one of the ML model or the additional ML model for deployment based on the accuracy metric and the additional accuracy metric.

9. The method of claim 2, further comprising:

receiving an additional video segment;

selecting a plurality of additional video subsegments of the additional video segment based on the selection criteria;

generating a grouping of the first plurality of subsegments and the plurality of additional video subsegments; and training the ML model using the grouping of the first plurality of subsegments and the plurality of additional video subsegments.

10. A management node comprising:

at least one processor; and at least one memory storing instructions that, when executed, cause the at least one processor to:

receive a video segment comprising a first plurality of subsegments and a second plurality of subsegments;

select the first plurality of subsegments of the video segment for training a machine learning (ML) model, the selection being based on a selection criteria that comprises rules based on a subsegment characteristic, the subsegment characteristic comprising:

a weight of a pre-weighed subsegment; or association with an object present in one or more of previously selected subsegments and in an additional subsegment, the object in the additional subsegment having at least one modified characteristic;

train the ML model using the first plurality of subsegments that were selected based on the selection criteria, the second plurality of subsegments of the video segment not being used for training the ML model; and after training the ML model, test the trained ML model based on an accuracy threshold.

11. The management node of claim 10, wherein the rules are further based on a video segment characteristic comprising a length of the video segment.

12. The management node of claim 10, wherein the rules are further based on a system characteristic comprising a computing parameter of the management node.

13. The management node of claim 10, wherein the at least one memory stores computer the instructions that, when executed by the at least one processor, further cause the at least one processor to:

select a plurality of additional subsegments of the video segment based on an additional selection criteria, the plurality of additional subsegments being different from the first plurality of subsegments and the second plurality of subsegments; and train an additional ML model using the plurality of additional subsegments selected based on the additional selection criteria.

14. The management node of claim 13, wherein the at least one memory stores computer the instructions that, when executed by the at least one processor, further cause the at least one processor to test the additional ML model based on the accuracy threshold.

15. The management node of claim 14, wherein the at least one memory stores computer the instructions that, when executed by the at least one processor, further cause the at least one processor to select one of the ML model or the additional ML model based on a result of testing the ML model and the additional ML model based on the accuracy threshold.

16. The management node of claim 13, wherein the at least one memory stores computer the instructions that, when executed by the at least one processor, further cause the at least one processor to:

generate an accuracy metric for the ML model;

generate an additional accuracy metric for the additional ML model; and select one of the ML model or the additional ML model for deployment based on the accuracy metric and the additional accuracy metric.

\* \* \* \* \*